United States Patent [19]
Chavez

[11] Patent Number: 5,983,836
[45] Date of Patent: Nov. 16, 1999

[54] MULTI-FUNCTIONAL RETRACTABLE PET LEASH APPARATUS

[76] Inventor: Santiago J. Chavez, 807 N. Fl. Ave., Wauchula, Fla. 33873

[21] Appl. No.: 09/115,885

[22] Filed: Jul. 15, 1998

[51] Int. Cl.⁶ ................................................. A01K 27/00
[52] U.S. Cl. .......................... 119/796; 119/795; 119/797; 242/385.4; 242/398; 242/405
[58] Field of Search ..................................... 119/795, 796, 119/794, 797, 769, 789; 242/385.4, 398, 405

[56] References Cited

U.S. PATENT DOCUMENTS

| | | | |
|---|---|---|---|
| 2,776,644 | 1/1957 | Fontaine | 119/109 |
| 3,315,642 | 4/1967 | Rogers et al. | 119/109 |
| 4,269,150 | 5/1981 | McCarthy | 119/109 |
| 4,501,230 | 2/1985 | Talo | 119/109 |
| 5,462,019 | 10/1995 | Hong-Rong et al. | 119/795 |
| 5,595,143 | 1/1997 | Alberti | 119/794 |

*Primary Examiner*—Michael J. Carone
*Assistant Examiner*—Judith A. Nelson
*Attorney, Agent, or Firm*—Joseph N. Breaux

[57] ABSTRACT

A multi-functional retractable pet leash comprising a housing having integrally formed therewith a handle wherein the housing houses therein a first spooling mechanism which spools a flexible leash member for tethering an animal and a second spooling mechanism which spools a strapping means for strapping the housing to a tree or post of varying circumferences. Additionally, the housing houses therein a flashlight assembly wherein at least a portion of the front of the housing is transparent to allow light to project therethrough.

12 Claims, 3 Drawing Sheets

MULTI-FUNCTIONAL RETRACTABLE PET LEASH APPARATUS

TECHNICAL FIELD

The present invention relates to retractable pet leashes and, more particularly, to a multi-functional retractable pet leash comprising a housing having integrally formed therewith a handle wherein the housing houses therein a first spooling mechanism which spools a flexible leash member for tethering an animal and a second spooling mechanism which spools a strapping means for strapping the housing to a tree or post of varying circumferences. Additionally, the housing houses therein a flashlight assembly wherein at least a portion of the housing is transparent to allow the light to project therethrough.

BACKGROUND OF THE INVENTION

Leashes are commonly used to walk animals in the parks, neighborhoods, etc. so that the pet cannot wander away from its owner. Since many pet owners work during the day, typically, pet owners walk their pet at night. Henceforth, I have determined that integrating a lighting device and a retractable leash will eliminate the need for pet owners to carry a separate flash light while walking their pet at night. Moreover, I have determined that integrating a strapping means for strapping the pet to a post such as while in the park or the like is very desirable.

Several devices have been patented which are aimed at pet leashes.

U.S. Pat. No. 5,595,143, to Alberti, entitled "RETRACTABLE LEASH APPARATUS PROVIDING FOR DOUBLING THE RANGE AND RETRACTION SPEED OF SUCH APPARATUS WITHOUT TENSION INCREASE" discloses a leash apparatus which utilizes two commercially available self retracting leashes, one carried by on the leashed animal and the other carried by the animal owner. Each leash has a button which, when a button is pushed, locks the leash line reel in the leash. The button on the user hold leash is manually operated. The button on the animal carried leash is operated by remote control.

U.S. Pat. No. 5,462,019, to Hong-Rong et al., entitled "ANIMAL LEASH" discloses an animal leash which is made of aircraft cable of a particular length. The cable includes a clamp having an eye for receiving a snap connector for securing the cable about a tree or post so that the animal can readily move around the tree or post.

U.S. Pat. No. 4,501,230, to Talo, entitled "RETRACTING AND LOCKING ANIMAL LEASH" discloses a hand-held apparatus which dispenses, retracts and locks an animal leash in a desired position. The apparatus includes a housing having an elongated handle portion adapted to be grasped in the hands of the user and a generally cylindrical spool/cord reservoir portion from which the cord extends coupled to the top of the handle portion.

U.S. Pat. No. 4,269,150, to McCarthy, entitled "DOG LEASH" discloses a retractable leash device which includes a leash cable which is wound on a spring-loaded spool. The housing of the device includes an outer casing which is essentially shaped like two hollow truncated pyramids aligned base to base. One end of the outer casing functions as a hand grip wherein the hand grip is provided with a spring loaded braking plate so that squeezing the handgrip causes the teeth on the braking plate to engage and stop the leash cable.

U.S. Pat. No. 3,315,642, to Rogers et al., entitled "EXTENSIBLE ANIMAL LEASH" discloses an extensible animal leash having a casing for spooling therein a flexible leash. The casing has coupled thereto a flexible strap for holding the extensible animal leash by the animal owner.

U.S. Pat. No. 2,776,644, to Fontaine, entitled "ANIMAL TETHERING DEVICE" discloses an animal tethering device which includes a casing for spooling therein the leash and a loop strap which extends from the rear end of the casing and can be snugly fit about the wrist while the casing is held in the hand.

While each of the above pet leashes function as desired, none of them have a multi-functional retractable pet leash comprising a housing having integrally formed therewith a handle wherein the housing houses therein a first spooling mechanism which spools a flexible leash member for tethering an animal and a second spooling mechanism which spools a strapping means for strapping the housing to a tree or post of varying circumferences. Additionally, the housing houses therein a flashlight assembly wherein at least a portion of the housing is transparent to allow the light to project therethrough.

As will be seen more fully below, the present invention is substantially different in structure, methodology and approach from that of the prior retractable pet leashes.

SUMMARY OF THE INVENTION

The preferred embodiment of the multi-functional retractable pet leash apparatus of the present invention solves the aforementioned problems in a straight forward and simple manner. What is provided is a multi-functional retractable pet leash comprising a housing having integrally formed therewith a handle wherein the housing houses therein a first spooling mechanism which spools a flexible leash member for tethering an animal and a second spooling mechanism which spools a strapping means for strapping the housing to a tree or post of varying circumferences. Additionally, the housing houses therein a flashlight assembly wherein at least a portion of the housing is transparent to allow the light to project therethrough.

The multi-functional retractable pet leash apparatus of the present invention comprises: a housing having a front chamber and a rear handle member; a first spooling mechanism coupled in said front chamber; a second spooling mechanism coupled in said front chamber; a flexible leash spooled around said first spooling mechanism for tethering a pet; a latching mechanism coupled to a rear of said housing; and, a flexible strap member spooled around said second spooling mechanism wherein said flexible strap member has a length adapted to strap said housing to a tree or post and wherein said flexible strap member is latched to said housing via said latching mechanism.

Additionally, the multi-functional retractable pet leash apparatus of the present invention comprises:

a housing having a front chamber and a rear handle member wherein said housing comprises a transparent front housing portion made of transparent material, a flashlight assembly, a first spooling mechanism coupled in said front chamber; and, a flexible leash spooled around said first spooling mechanism for tethering a pet. The flashlight assembly comprises: a battery housed in said housing; means for illuminating housed in said housing and positioned behind said transparent front housing portion; and means for switching on and off said illuminating means coupled to said housing.

In view of the above, an object of the present invention is to provide a multi-functional retractable pet leash apparatus which includes a flashlight assembly for lighting the area in front of the housing such as, without limitation, ground, sidewalk, and bushes. Another object of the present invention is to provide a multi-functional retractable pet leash apparatus which includes a retractable strapping means having a predetermined length wherein the retractable strapping means allows the rear end of the housing to be removably attached to a tree or post. The retractability feature of the strapping means allows the length of such strapping means to be varied so the strapping means can be looped around trees or posts of varying circumferences.

A further object of the present invention is to provide a multi-functional retractable pet leash apparatus which includes a first spooling mechanism which unwinds in a first direction a flexible leash member for tethering an animal and a second spooling mechanism which unwinds in a second direction having a strapping means for strapping the housing to a tree or post of varying circumferences. More specifically, the flexible leash member pulled out of the front portion of housing and the strapping means is pulled out of the rear portion of the housing.

In view of the above objects, it is a feature of the present invention to provide a multi-functional retractable pet leash apparatus which is simple to use.

Another feature of the present invention is to provide a multi-functional retractable pet leash apparatus which is relatively simple structurally and thus simple to manufacture.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
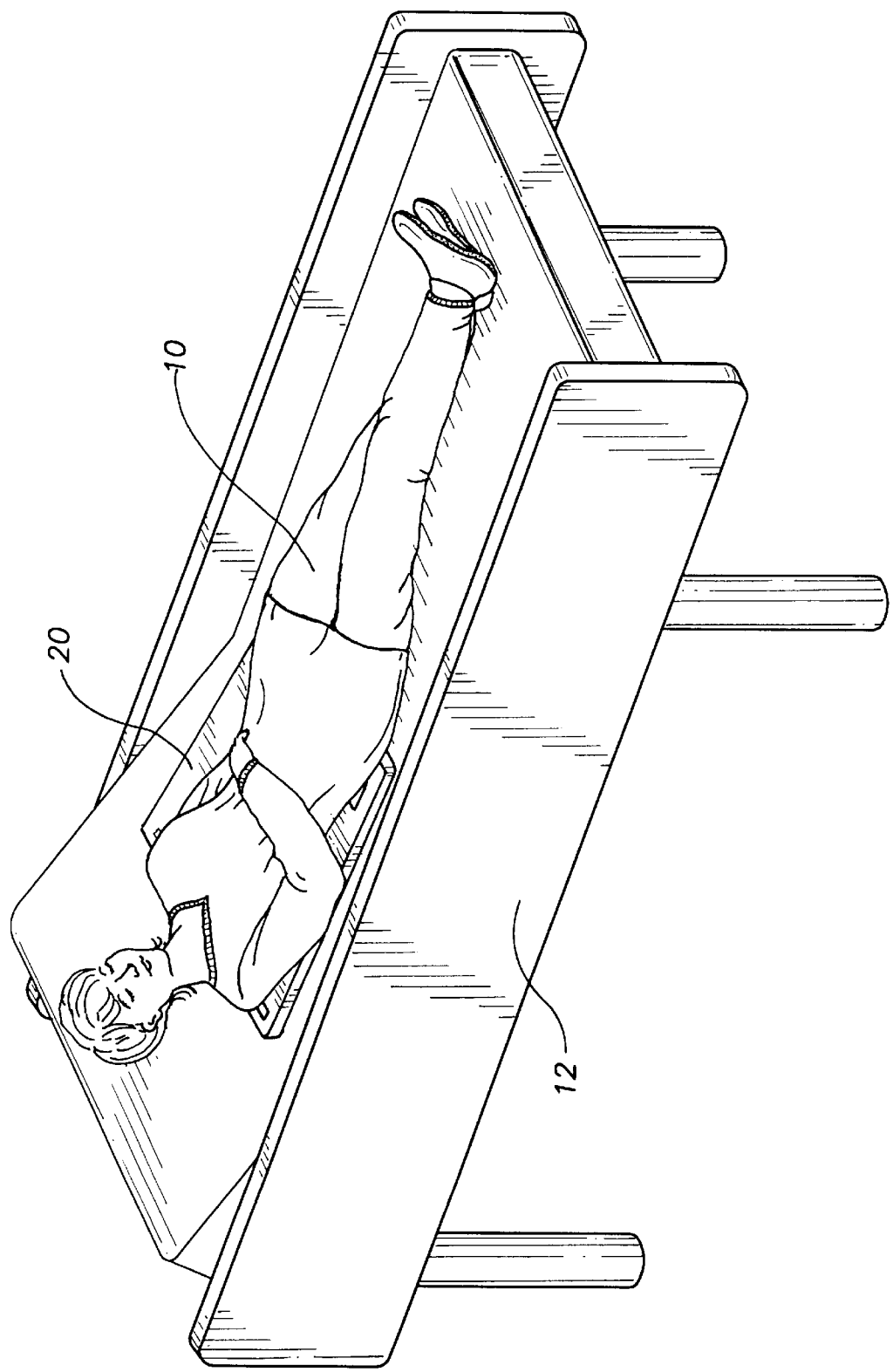
FIG. 1 illustrates a top view of the preferred embodiment of the multi-functional retractable pet leash apparatus of the present invention.
Figure 3:
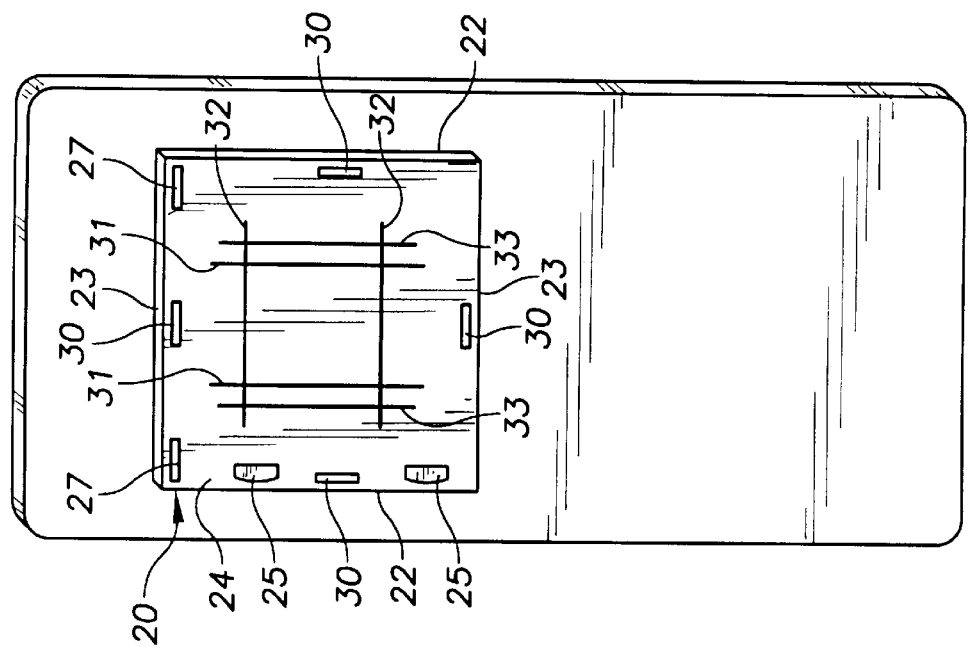
FIG. 3 illustrates a rear end view of the multi-functional retractable pet leash apparatus; and, FIG. 4 illustrates the extension member of the flexible strap member.
Figure 2:
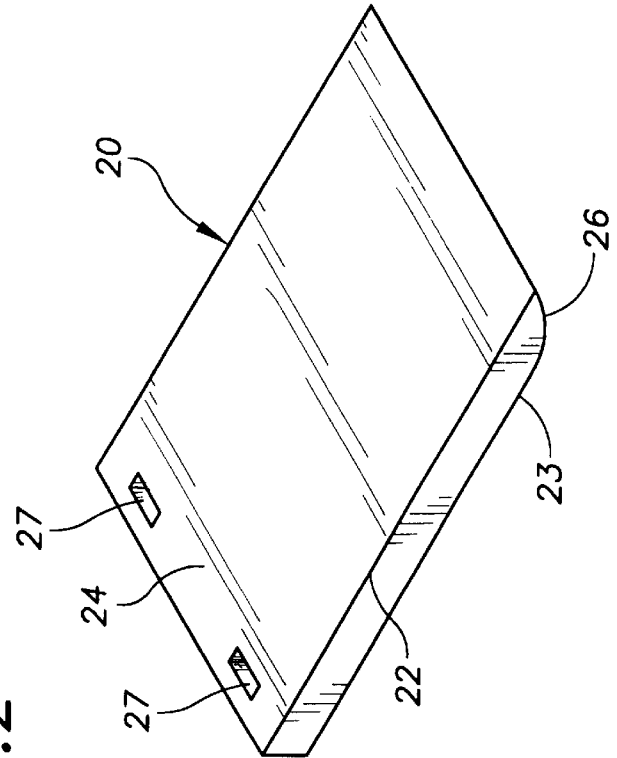
FIG. 2 illustrates an front end view of the multi-functional retractable pet leash apparatus.

Referring now to the drawings, and in particular FIGS. 1–3, the multi-functional retractable pet leash apparatus of the present invention is designed generally by the numeral 10. Multi-functional retractable pet leash apparatus 10 is comprised of housing 20, first spooling mechanism 30, flexible leash member 35, second spooling mechanism 40, strapping means 45 and flashlight assembly 50.

Referring now to FIG. 1, housing 20 comprises a generally rectangularly-shaped enclosure having formed therein a generally rectangularly-shaped opening 21 toward the rear of housing 20 thereby creating handle member 22. The generally rectangularly-shaped opening 21 is dimensioned to allow the user's hands to be placed therein and around handle member 22. Housing 20 is defined by top surface member 23a, bottom surface member 23b, front and rear side surfaces 23c and 23d perpendicularly coupled to the front and rear edges of top and bottom surface members 23a and 23b, respectively, and left and right side surfaces 23e and 23f perpendicularly coupled to left and right rear edges of top and bottom surfaces. Furthermore, housing 20 includes interior rectangular wall 24 defining the interior perimeter of rectangularly-shaped opening 21.

Front side surface 23c has formed therein aperture 25 in close proximity to corner 27a of housing 20. Furthermore, a portion 26 of front side surface 23c in close proximity to corner 27b of housing 20 is made of transparent material. More specifically, preferably, all surfaces in close proximity to front corner 27b is made of transparent material to define transparent flashlight cover 55.

Rear side surface 23d has formed therein first and second apertures 28a and 28b. First aperture 28a is formed in rear side surface 23d in close proximity to rear corner 27c of housing 20. Second aperture 28b is formed in rear side surface 23d in close proximity to rear corner 27d.

As can be readily seen, the front of housing 20 defines front chamber 20a and the rear of housing 20 defined handle member 22 wherein front chamber 20a and handle member 22 are essentially separately defined by rectangularly-shaped opening 21. Handle member 22 also provides handle chamber 29. In the preferred embodiment, handle chamber 29 stores therein battery means 51. Nevertheless, battery means 51 may be stored in front chamber 20a.

While housing 20 of the present invention is generally rectangularly-shaped, other geometrical shapes may be substituted as desired. Moreover, the description given herein with respect to housing 20 is with reference to top surface member 23a being positioned in the horizontal plane. However, when using multi-functional retractable pet leash apparatus 10, top surface member 23a may be positionable in the vertical plane.

Front chamber 20a has coupled therein first spooling mechanism 30 and second spooling mechanism 40. First spooling mechanism 30 has spooled therearound flexible leash member 35 for tethering a pet wherein the free end of flexible leash member 35 has coupled thereto hooking mechanism 36 for hooking flexible leash member 35 to a pet collar (not shown). Aperture 25 formed in front side surface 23c tethers therethrough flexible leash member 35. Right side surface 23f has coupled thereto leash lock/release trigger 33 which functions to release flexible leash member 35 to allow the pet to be tethered on flexible leash member 35. In other words, flexible leash member 35 is free to be un-spooled from first spooling mechanism 30 as the pet pulls on flexible leash member 35. Additionally, leash lock/release trigger 33 when triggered serves to prevent the un-spooling of flexible leash member 35 even if the pet pulls on flexible leash member 35. Leash lock/release trigger 33 has a release position for releasing flexible leash member 35 and a locking position for locking flexible leash member 35 to a predetermined extended length.

Figure 4:
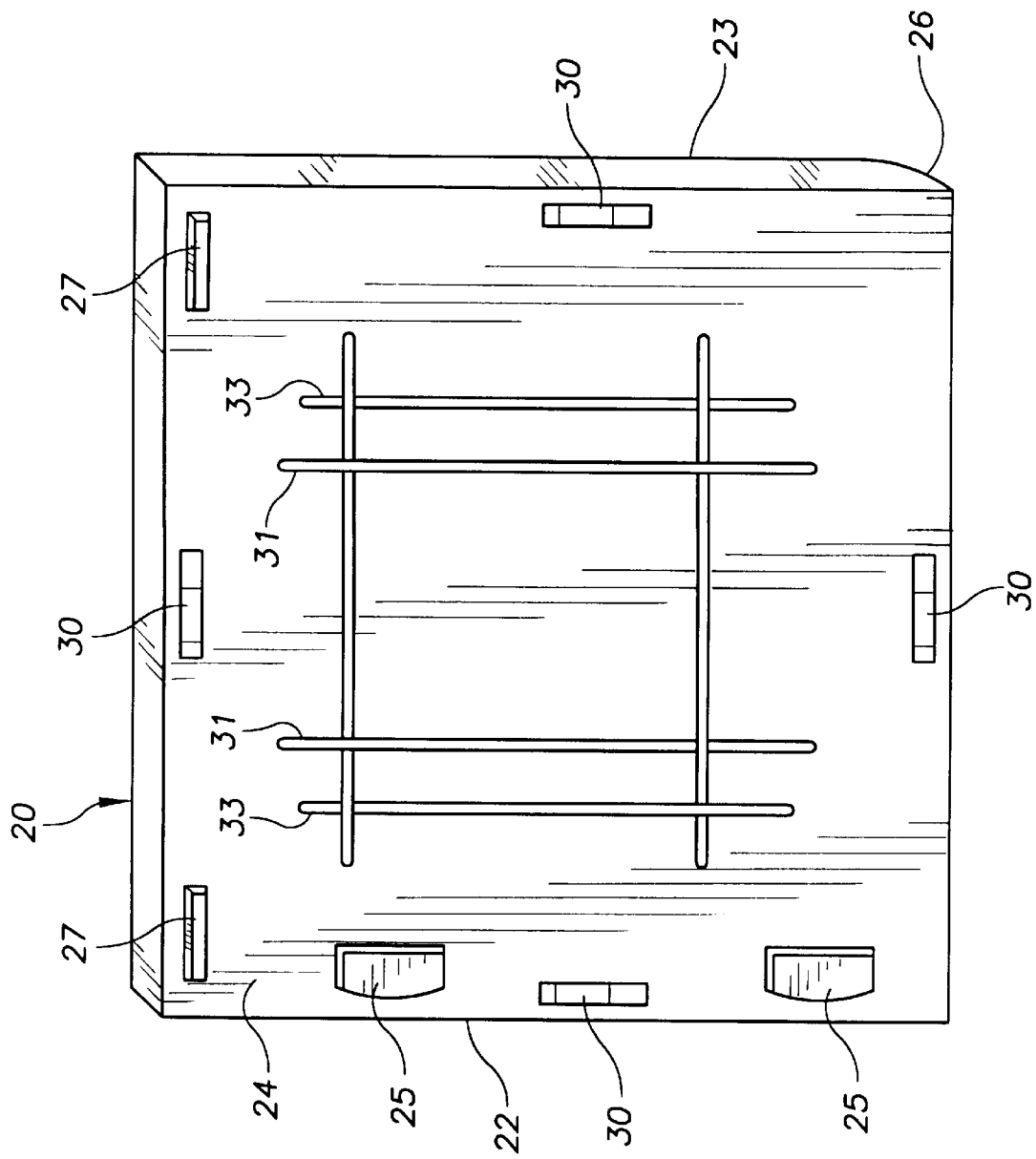
Figure 1:
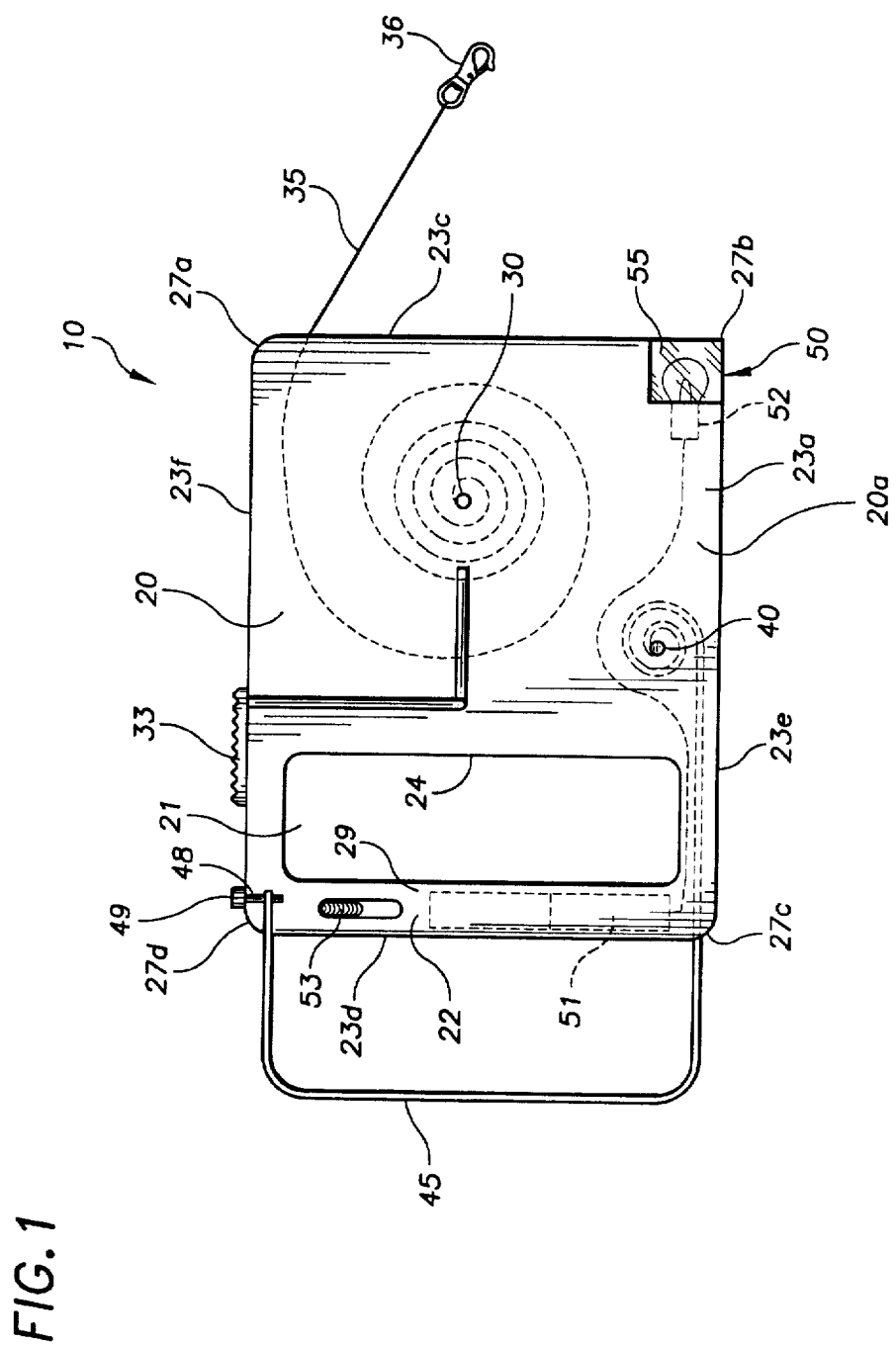
Figure 2:
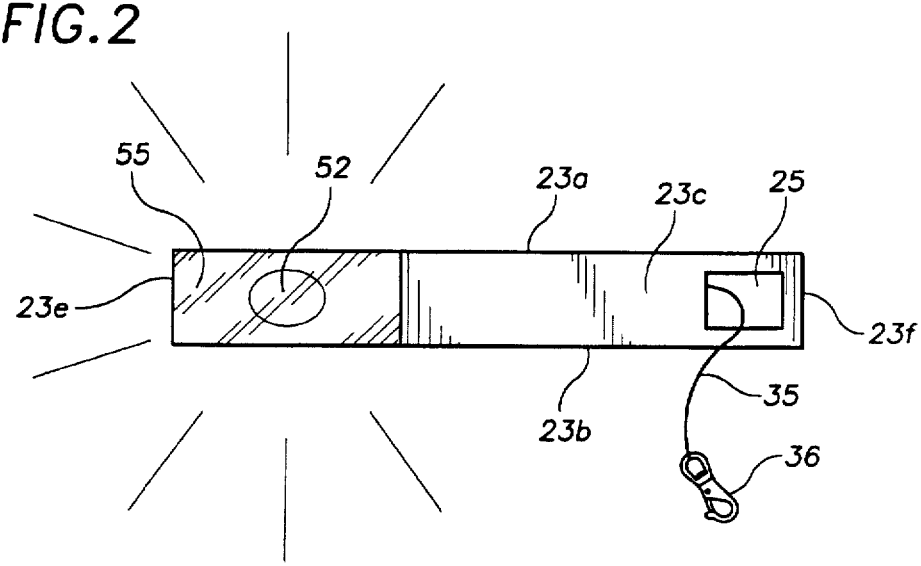
Figure 3:
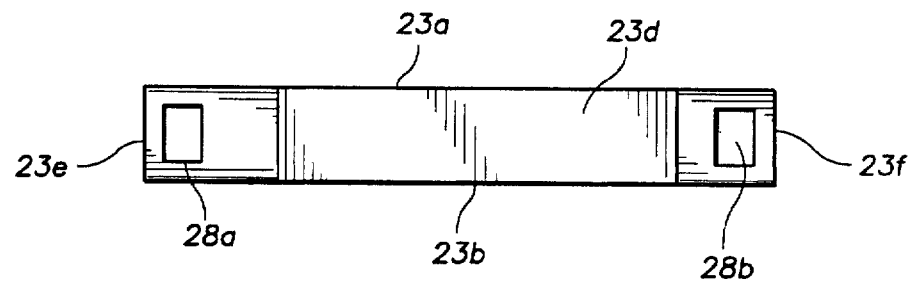
Figure 4:
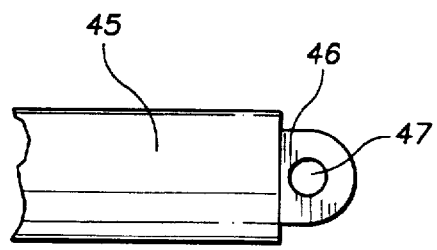

Second spooling mechanism 40 has spooled therearound flexible strap member 45. Flexible strap member 45 has a free end which has fixedly attached thereto extension member 46, as best seen in FIG. 4, which has formed therein eyelet 47. Extension member 46 is received in second aperture 28b formed in rear surface 23d in close proximity to corner 27d. Housing 20 has coupled therein latching mechanism 48 for latching to eyelet 47 so that flexible strap member 45 can be latched in second aperture 28b as flexible strap member 45 is wrapped around a tree or post.

On right side 23f in close proximity to rear corner 27c, releasing mechanism 49 is positioned to release latching mechanism 48. Thereby, flexible strap member 45 can be unlatched from the latching mechanism 48 and free to be spooled around second spooling mechanism 40. In the preferred embodiment, flexible strap member 45 is latched in second aperture 28b by latching mechanism 48 and unlatched and released by releasing mechanism 49 in a manner similar to that of seat belts.

First spooling mechanism 30 is essential forwardly disposed in front chamber 20a with respect to the position of second spooling mechanism 40 so that spooling of first spooling mechanism 30 does not interfere with the spooling of second spooling mechanism 40. Second spooling mechanism 40 is rearwardly disposed to allow flexible strap member 45 to be easily retracted into and extended from rear aperture 28a.

In the preferred embodiment, first and second spooling mechanisms 30 and 40 are spring loaded spooling mechanisms.

Flexible strap member 45 has a predetermined length wherein the retractability of flexible strap member 45 allows flexible strap member 45 to be conveniently stored in housing 20 until needed. However, when a pet owner desires to strap their pet to a tree, post or other fixed object, flexible strap member 45 can be quickly pulled to extend the length thereof around the tree, post or other fixed object. The predetermined length of flexible strap member 45 should be sufficient to accommodate a wide range of tree and/or post circumferences so that the length of flexible strap member 45 can be looped around trees or posts of varying circumferences.

When flexible strap member 45 is strapped to a tree, post or other fixed object, the rear end of housing 20 is secured to the tree, post or other fixed object. Henceforth, the flexible leash member 35 is free to tether through aperture 25 even while housing 20 is secured to a tree, post or other fixed object. The flexible leash member 35 allows the pet to be tethered from the tree or post.

Flashlight assembly 50 comprises battery means 51, illuminating means 52, on/off switching means 53 and transparent flashlight cover 55. Battery means 51 may be placed essentially anywhere in housing 20. However, preferably, battery means 31 is stored in handle chamber 29 defined by handle member 22. Furthermore, in the preferred embodiment, on/off switching means 53 is positioned on the top surface of handle member 22. Illuminating means 52 is positioned directly behind portion 26 (made of transparent material) of front side surface 23c in close proximity to corner 27b of housing 20. More specifically, illuminating means 52 is positioned behind transparent flashlight cover 55. As can be appreciated, the properties of transparent material allows the illumination from illuminating means 52 to be shown therethrough. When the pet owner walks their pet during the night or dusk hours, flashlight assembly 50 allows, the immediate area in front the owner to be illuminated.

Battery means 51 is electrically connected to illuminating means 52 in front chamber 20a. Housing 20 further includes a door (not shown) to allow battery means 51 to be placed in or remove from handle chamber 29.

It is noted that the embodiment of the multi-functional retractable pet leash apparatus described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multi-functional retractable pet leash apparatus comprising:

a housing having a front chamber and a rear handle member;

a first spooling mechanism coupled in said front chamber;

a second spooling mechanism coupled in said front chamber;

a flexible leash spooled around said first spooling mechanism for tethering a pet;

a latching mechanism coupled to a rear of said housing; and, a flexible strap member spooled around said second spooling mechanism wherein said flexible strap member has a length adapted to strap said housing to a tree or post and wherein said flexible strap member is latched to said housing via said latching mechanism.

2. The multi-functional retractable pet leash apparatus of claim 1, wherein said flexible leash is un-spooled in a first direction and said flexible strap member is un-spooled n a second direction opposite said first direction.

3. The multi-functional retractable pet leash apparatus of claim 1, wherein said housing comprises a transparent housing portion made of transparent material.

4. The multi-functional retractable pet leash apparatus of claim 3, further comprising a flashlight assembly wherein said flashlight assembly comprises:

a battery housed in said housing;

means for illuminating housed in said housing and positioned behind said transparent housing portion; and, means for switching on and off said illuminating means coupled to said housing.

5. The multi-functional retractable pet leash apparatus of claim 4, wherein said on and off switching means is positioned on said handle member.

6. The multi-functional retractable pet leash apparatus of claim 4, wherein said battery is housed in said handle member.

7. The multi-functional retractable pet leash apparatus of claim 1, wherein said first and second spooling mechanisms are spring loaded spooling mechanisms.

8. The multi-functional retractable pet leash apparatus of claim 1, further comprising a leash lock/release trigger coupled to said housing and having a release position for releasing said flexible leash and a locking position for locking said flexible leash to a predetermined extended length.

9. A multi-functional retractable pet leash apparatus comprising:

a housing having a front chamber and a rear handle member wherein said housing comprises a transparent front housing portion made of transparent material;

a flashlight assembly wherein said flashlight assembly comprises:

a battery housed in said housing, means for illuminating housed in said housing and positioned behind said transparent front housing portion, and means for switching on and off said illuminating means coupled to said housing;

a first spooling mechanism coupled in said front chamber;

a flexible leash spooled around said first spooling mechanism for tethering a pet;

a second spooling mechanism coupled in said front chamber;

a latching mechanism coupled to a rear of said housing; and, a flexible strap member spooled around said second spooling mechanism wherein said flexible strap member has a length adapted to strap said housing to a tree or post and wherein said flexible strap member is latched to said housing via said latching mechanism.

10. The multi-functional retractable pet leash apparatus of claim 9, wherein said flexible leash is un-spooled in a first direction and said flexible strap member is un-spooled n a second direction opposite said first direction.

11. The multi-functional retractable pet leash apparatus of claim 9, wherein said on and off switching means is positioned on said handle member.

12. The multi-functional retractable pet leash apparatus of claim 9, wherein said battery is housed in said handle member.

\* \* \* \* \*

UNITED STATES PATENT AND TRADEMARK OFFICE
CERTIFICATE OF CORRECTION

PATENT NO. : 5,983,836
DATED      : Nov. 16, 1999
INVENTOR(S) : Santiago J. Chavez It is certified that error appears in the above-identified patent and that said Letters Patent is hereby corrected as shown below:

Cancel drawing Figures 1-4 and replace them with the correct drawing Figures 1-4 appended hereto.

Signed and Sealed this

Seventeenth Day of April, 2001

*Attest:*

NICHOLAS P. GODICI

*Attesting Officer*   Acting Director of the United States Patent and Trademark Office